United States Patent [19]
Moore

[11] Patent Number: 5,682,548
[45] Date of Patent: Oct. 28, 1997

[54] INTERFACE COMPONENT FOR COUPLING MAIN BUS OF COMPUTER SYSTEM TO PERIPHERAL PORTS HAVING WINDOWS EACH INCLUDES BIT SPECIFYING WHETHER OPERATIONS ARE QUIET OR NOT QUIET

[75] Inventor: Terrill M. Moore, Trumansburg, N.Y.

[73] Assignee: Databook, Incorporated, Ithaca, N.Y.

[21] Appl. No.: 105,645

[22] Filed: Aug. 12, 1993

[51] Int. Cl.$^6$ ................................................... G06F 15/40
[52] U.S. Cl. ................................................... 395/823
[58] Field of Search ................................. 395/823, 846, 395/857, 858, 821–825, 828–830, 834, 835, 280–284, 800, 750

[56] References Cited

U.S. PATENT DOCUMENTS

| | | | |
|---|---|---|---|
| 4,314,334 | 2/1982 | Daughton et al. | 395/823 |
| 4,755,934 | 7/1988 | Inoue | 395/823 |
| 4,992,976 | 2/1991 | Yonekura et al. | 395/500 |
| 5,038,320 | 8/1991 | Heath et al. | 395/830 |
| 5,167,024 | 11/1992 | Smith et al. | 395/750 |
| 5,262,998 | 11/1993 | Mnich et al. | 365/222 |
| 5,345,564 | 9/1994 | Jensen et al. | 395/823 |
| 5,414,815 | 5/1995 | Schwede | 395/846 |
| 5,428,798 | 6/1995 | Sekine et al. | 395/750 |
| 5,440,748 | 8/1995 | Sekine et al. | 395/750 |
| 5,481,755 | 1/1996 | Harper et al. | 395/823 |
| 5,506,995 | 4/1996 | Yoshimoto et al. | 395/800 |
| 5,530,895 | 6/1996 | Enstrom | 395/829 |

OTHER PUBLICATIONS

"Push a 32-bit Microchannel bus to the limit", by Dejager, Greg, Electronic Design, v38, n13, p61(5), Jul. 12, 1990.

*Primary Examiner*—Moustafa M. Meky
*Attorney, Agent, or Firm*—Nixon, Hargrave, Devans & Doyle

[57] ABSTRACT

In a typical microprocessor based computer, many peripheral and memory devices 11, 12, 14 are connected directly to the system bus 20. Consequently, energy is wasted driving bus signals to those devices during cycles not intended for those devices. Power conservation is particularly important in portable, battery-powered systems. Credit card sized PCMCIA cards 26, 27, 28 are user-installable mass storage and I/O communication options, interfaced by an interface controller 50 interposed between the host system bus 20 and the card slots 6,7,8. The invention provides the capability for the interface controller 50 to operates a quiet bus to a plurality of, or to a single, PCMCIA card slot(s) 6, 7, 8 when configured to do so. In the quiet bus mode, address signals are not passed through to the PCMCIA card until a memory or I/O card address match qualified by appropriate control signals from the microprocessor 16 are detected, indicating a bus cycle intended for the card peripheral.

11 Claims, 5 Drawing Sheets

5,682,548

INTERFACE COMPONENT FOR COUPLING MAIN BUS OF COMPUTER SYSTEM TO PERIPHERAL PORTS HAVING WINDOWS EACH INCLUDES BIT SPECIFYING WHETHER OPERATIONS ARE QUIET OR NOT QUIET

BACKGROUND

This invention relates in general to computer systems and computer system components, and, in particular, to a method and apparatus for selectively connecting peripherals with the main bus of a microprocessor controlled computer system.

In the present environment of personal computers, a bus controller connects a microprocessor to one or more peripheral devices. In normal operation, a microprocessor issues an address. The address may be to main memory or to one or more peripherals. The peripherals connected to the microprocessor may include memory, input or output devices such as a modem or a fax machine, or mass storage devices such as a disk drive or a flash memory card. With the advance of technology, computers have now shrunk in size from desk top models to lap top and palm top models. Along with the shrinking in size of the computer systems, peripherals have kept pace so that many peripherals are now only the size of credit cards. Such peripherals are commonly denominated as PCMCIA peripherals.

PCMCIA peripherals simply plug into or are otherwise inserted into a computer. In general, the port that accepts the PCMCIA peripheral is coupled to a PCMCIA interface component. The PCMCIA interface component includes an internal bus that normally couples the peripherals to the main bus of the computer. As such, in PCMCIA equipped computers, the peripheral ports are normally connected to the microprocessor.

Computers with PCMCIA ports are often operated from battery power. As such, it is important to conserve as much power as possible. However, during normal operation with prior art PCMCIA equipped systems, the microprocessor continuously issues addresses to the PCMCIA interface component and, either through the interface component, or in a manner so as to bypass the component, to the PCMCIA ports. This transmission of the microprocessor address signals to each port consumes AC power. During a normal cycle, all of the ports receive the address signal and the signal pins of the ports are driven regardless of whether a particular port is desired by the microprocessor. The microprocessor only decides which port to read or write data to after it has issued its address. The address itself does not distinguish between input/output devices or memory devices. It is only a separate command from the microprocessor which establishes the type of peripheral (I/O or memory), and the type of operation (read or write).

It is an object of this invention to reduce AC power consumption of a computer system equipped with a PCMCIA slot.

It is another object of this invention to provide a new interface component that operates using a quiet bus cycle.

SUMMARY

This invention provides a novel computer system and systems component. In the invention, a microprocessor outputs address and data signals on the main bus of the computer system. The microprocessor also outputs a read/write signal indicative of whether the microprocessor wants to read information at an address or write information to an address. A main bus carries the information and the read/write signal to other components, including a PCMCIA interface component. The PCMCIA interface component has an internal bus coupled to each of one or more peripheral ports. The peripheral ports are adapted to accept a PCMCIA peripheral, such as an I/O card or a memory card.

The interface component operates its own bus in either a quiet or non quiet mode. When operating in the quiet mode, the interface component uncouples its associated peripheral ports from the main bus of the computer. Meanwhile, the interface component monitors the address and command signals on the main bus. When the interface component detects a match between the address defined for any of the peripherals coupled to the component and the address on the bus, and receives a read/write signal from the microprocessor, the interface component terminates the quiet mode of operation and selectively couples the addressed peripheral to the main bus of the computer, enabling the propagation of address signals.

As such, the interface component effectively delays the command strobe of the computer in order to save AC power. The interface component issues its own peripheral strobe after it determines that one of its associated peripherals is being addressed by the microprocessor. In order to achieve this function, the interface component has associated storage devices or other programmable means for receiving and storing information about the peripheral coupled to its associated port. The interface component has associated software or other means which queries the PCMCIA card during initialization, and establishes the information stored in the interface component, configuring the interface component for the card which is actually present. Also, the interface component is programmable to operate in either a quiet mode or a non quiet mode. In the non quiet mode, the address bus or busses of the peripheral ports are always coupled through the bus of the interface component to the main address bus of the microprocessor. The interface component is equipped with a plurality of registers that hold information about the peripheral, including their addresses. Each register holds at least one bit of data indicating whether a peripheral may be operated in either a normal quiet or a non quiet mode.

DETAILED DESCRIPTION

Figure 1:
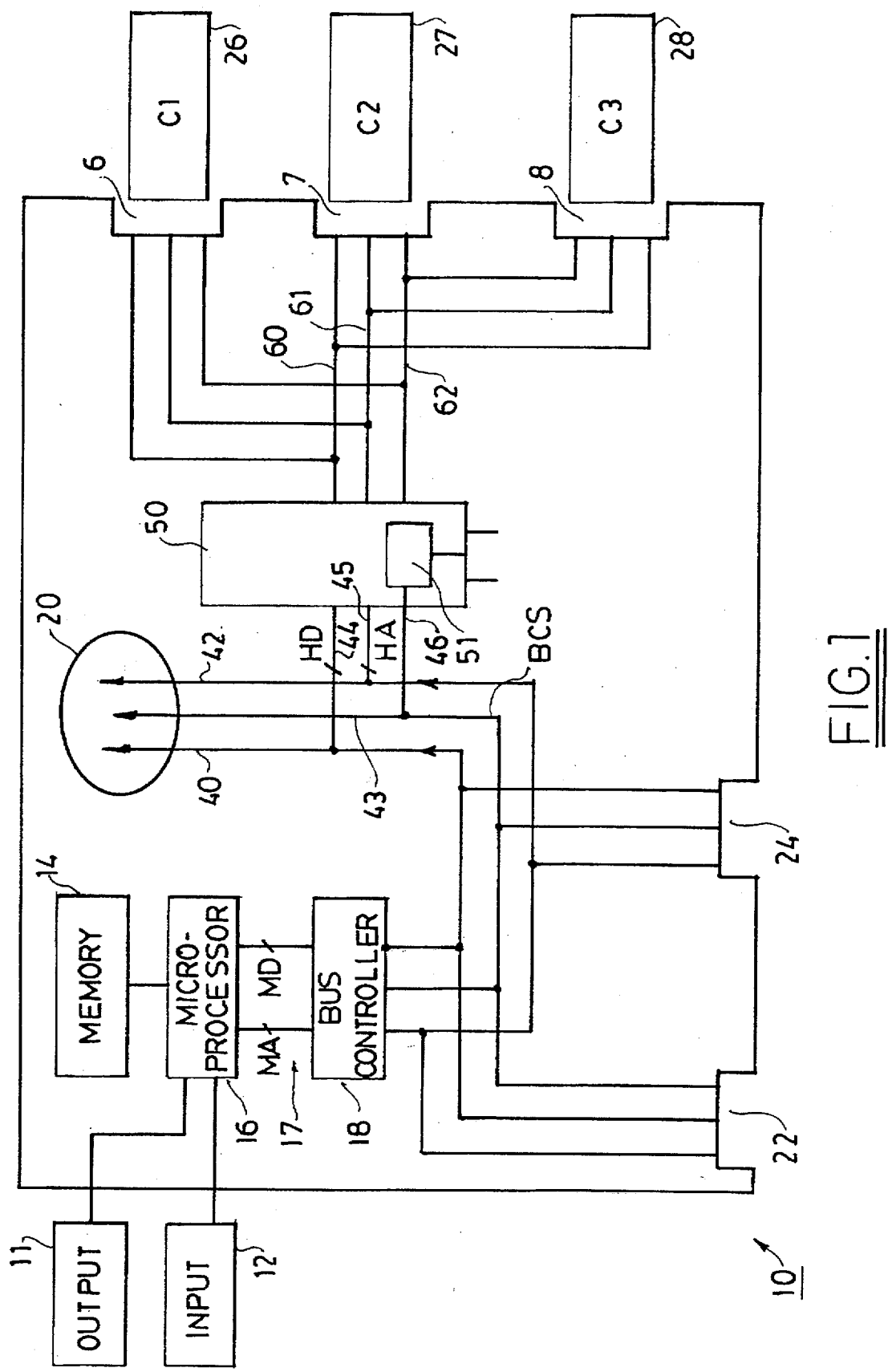
FIG. 1 is a schematic representation of a computer system including the invention.

Turning to FIG. 1, there is generally shown a computer system 10. The computer system 10 has an input device 12 such as a keyboard or other input and an output device such as a liquid crystal display screen or CRT device. The microprocessor 16 receives data from an input device 12, processes data in accordance with one or more programs, stores and retrieves data from memory 14, and outputs data to an output or display device 11. In the course of performing its normal functions, the microprocessor 16 also accesses one or more peripherals such as disk drives or modems, or other memory or I/O devices. The computer system 10 has peripheral ports 22, 24 for traditional peripheral devices as well as peripheral ports 6, 7, 8 that accommodate PCMCIA card devices 26, 27, 28. Such card devices 26, 27, 28 may be memory devices or I/O devices such as a modem. The cards 26–28 may be 8 bit or 16 bit cards and may operate on AT (16-bit) or XT (8-bit) bus cycles.

A bus controller 18 controls an ISA or similar system bus 20. ISA bus 20 is a bus normally used to connect microprocessor 16 to peripherals such as peripheral ports 22, 24. The ISA bus 20 also connects the microprocessor to the PCMCIA interface 50. The PCMCIA interface component 50 couples the ISA bus 20 to one or more of the PCMCIA peripherals 26–28. A typical PCMCIA interface component 50 is the DB86082 device manufactured by Databook Inc., assignee of this invention. The ISA bus 20 has address and data lines 40, 42 and bus control signal lines 43. The PCMCIA interface component 50 is coupled to the ISA bus 20 via host data lines 44, host address lines 45, and control lines 46.

Figure 2:
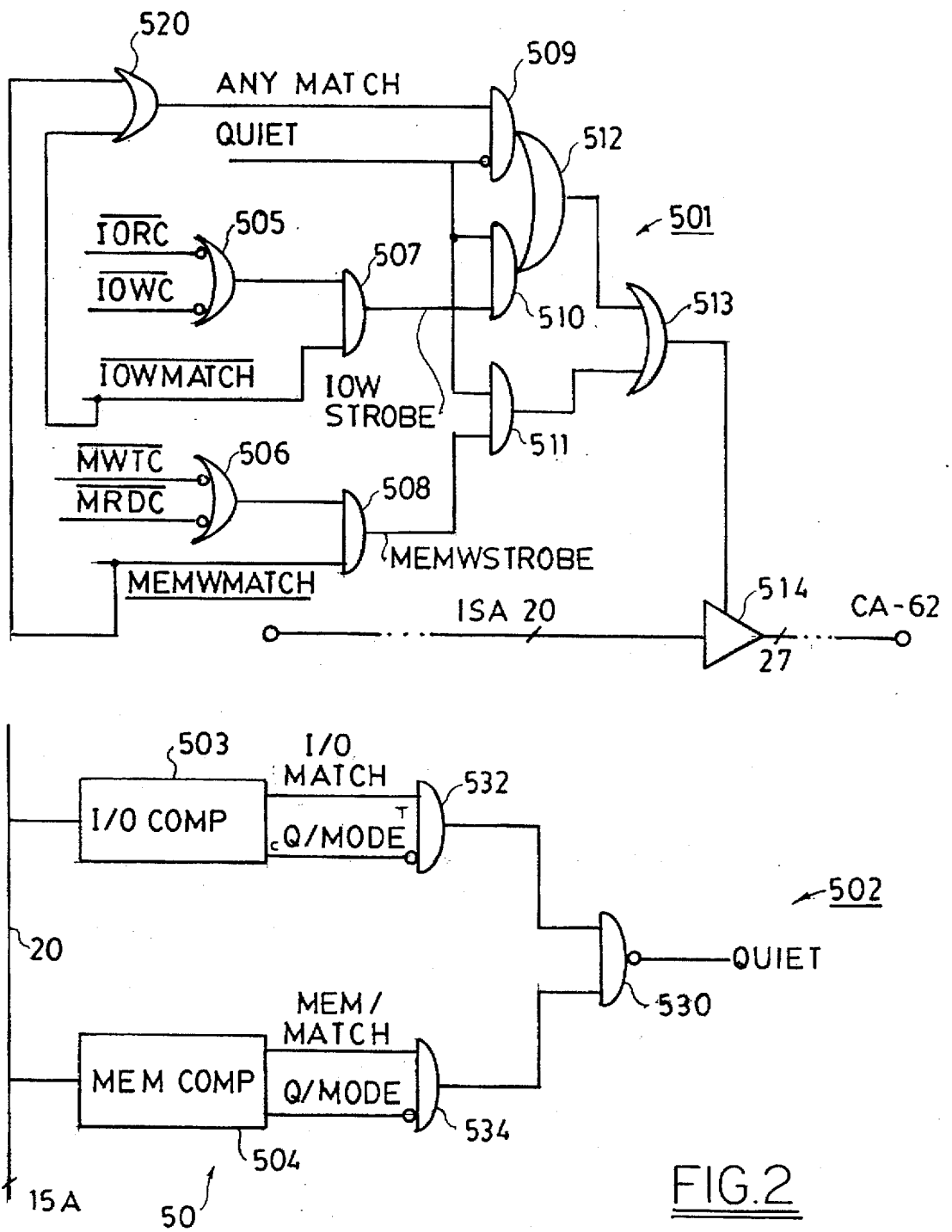
FIG. 2 is a schematic representation of the quiet mode logic of the invention.

With reference to FIG. 2, there is shown a further partial schematic diagram of the PCMCIA interface component 50, in particular, the quiet bus control logic circuit 501 and the quiet signal circuit 502. As stated earlier, the microprocessor 16 outputs an address on the ISA bus 20. The address on the ISA bus 20 is input to I/O comparator 503 as well as memory comparator 504. Within each of the comparators 503, 504, is stored the address(es) of the peripheral(s) 26, 27, 28 that is(are) coupled to the interface component 50. If the address on the ISA bus 20 matches the address stored in either comparator 503, 504, the comparator outputs a match signal, I/O-match or MEM-match. The I/O comparator also outputs its quiet mode bit, Q/MODE, to AND gate 532. The memory computer 504 similarly outputs its Q/MODE bit to AND gate 534. The outputs of gates 532 and 534 are input to NAND gate 530 to output a QUIET signal.

The microprocessor also outputs a read/write command. The read/write command may be one of four signals including an I/O read command IORC, an I/O write command IOWC, a memory write command MWTC or a memory read command MRDC. The individual read/write command signals are separately input into OR gates 505, 506 of quiet logic circuit 501. The output of OR gates 505, 506 are respectively coupled to AND gates 507, 508. The other input to AND gate 507 is the output of the I/O comparator 503, I/O-match. Similarly, the other output to AND gate 508 is the output of memory comparator 504, MEM-match.

The quiet logic circuit 501 includes a first AND gate 509. The inputs to first AND gate 509 include a signal ANY-MATCH which is the output of OR gate 520. The inputs to OR gate 520 are the signals I/O-match or MEM-match. As such, if there is ANYMATCH and the system is operating in a not quiet mode, AND gate 509 will have high output signal that will pass through OR gates 512, 513 to enable address bus buffers 514 and connect the ISA bus 20 to the card address bus 62. In a similar manner, if there is an I/O read or an I/O write command and an I/O-match, then AND gate 507 will have its output coupled to AND gate 510. If the system is operating in the quiet mode, the output of AND gate 510 will be high and OR gates 512, 513 will couple the high signal of AND gate 510 to the address bus buffers 514. When that occurs, the ISA bus 20 will be coupled to the card address bus 62.

Those skilled in the art will recognize that AND gates may be substituted for address buffers 514. The primary purpose of this circuit is to prevent extraneous transitions; for this purpose, either three-state buffers or logic gates are acceptable.

In a similar manner, when the system operates in the quiet mode, and the memory address of a peripheral port is identified followed by a memory read or write command, then a high output on AND gate 508 will likewise produce another high output on AND gate 511. The output of AND gate 511 will be coupled via OR gate 513 to three-state address bus buffers 514.

The QUIET signal on one input to AND gate 509 is user selectable. The interface component 50 includes certain programmable features. Among them is the ability to operate interface component 50 in either a quiet or a non-quiet mode. Interface 50 is also equipped with a default feature that automatically operates the system 10 in either a quiet or a non-quiet mode. The user of the computer system may select the quiet or non-quiet mode by suitably issuing a command from the microprocessor to set the quiet signal or quiet bit at the input to AND gate 509 to be a 1 or 0.

As stated above, the interface component 50 includes internal comparators 503, 504. (In fact, the interface component may contain multiple copies of each of the comparators 503 and 504; additional comparators allow more flexibility in addressing and compliance with industry standards related to PCMCIA.) In each comparator, there is a register that includes the address of the peripheral card 26, 27, 28 that is coupled to the interface component 50. Within the address information stored in comparators 503, 504, one bit of information in the register indicates whether the peripheral may be operated in quiet or a non-quiet mode. It is this bit in the register that may be set by the user.

It is desirable to operate in the quiet mode as much as possible. For this reason, the interface circuit may contain additional storage devices and logic so as to automatically switch the QUIET signal active or inactive, as determined by i) the particular comparators which have matched the current address, and ii) the states of the quiet-mode bits stored in each of the comparators 503, 504 and so forth.

For certain PCMCIA peripherals, it is neither desirable nor practical to operate the system 10 in the quiet mode. These peripherals are generally 16 bit I/O, the interface component 50 during an installation and configuration process not detailed here. In such cases, the interface component 50 will not enable the quiet mode and so will always run in the non-quiet mode when communicating with that card.

Figure 3:
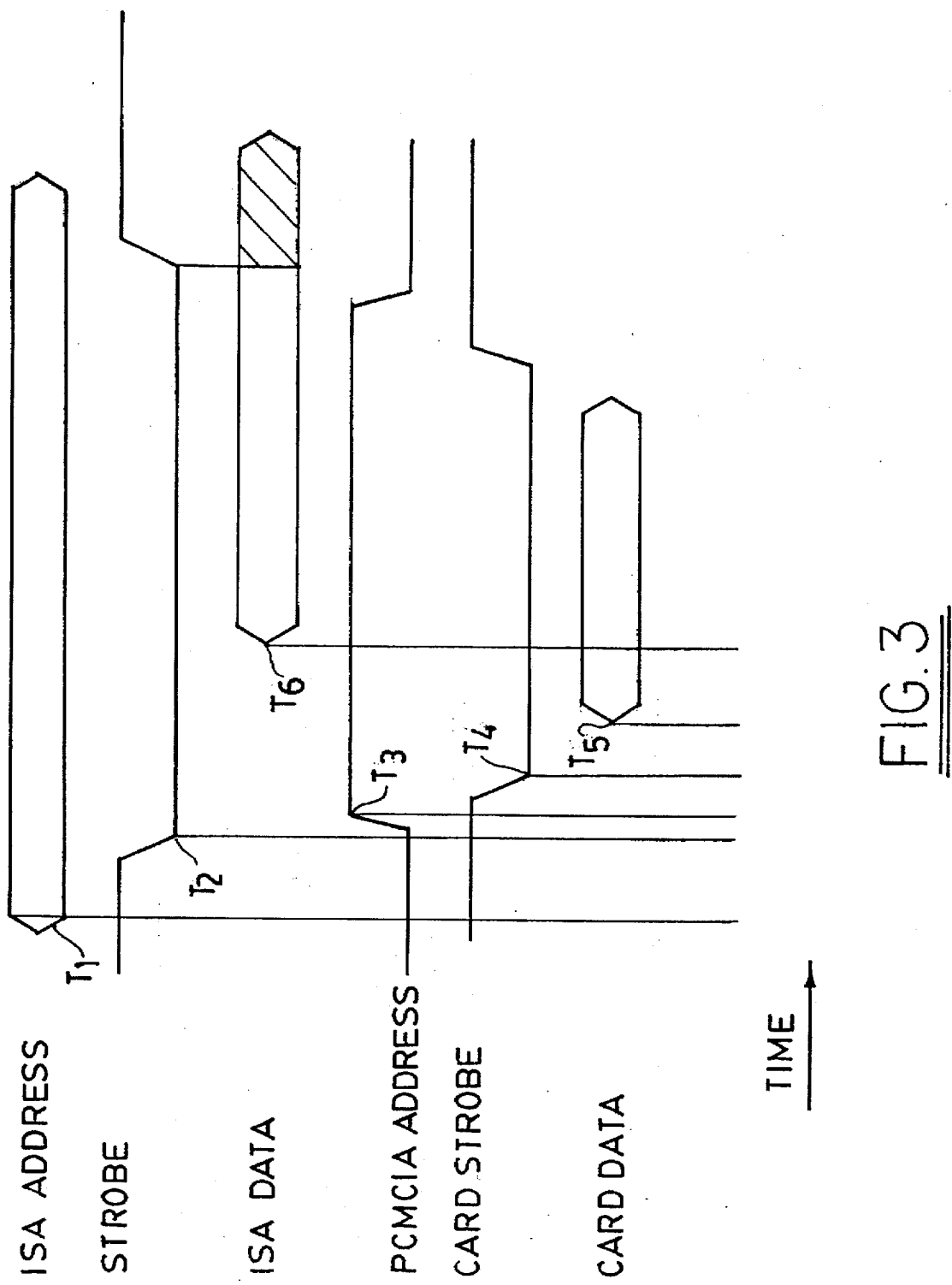
FIG. 3 is a timing diagram of a computer system operated in accordance with the invention.

Turning to FIG. 3, the operation of the invention will be explained with reference to the timing diagram. The timing diagram shows the general flow of operations when the microprocessor is reading data from a card. At a time T1, the microprocessor 20 issues its first address. At a time T2, the microprocessor will issue a strobe signal indicating that the address should be ready for reading of data. With the invention, the interface component 50 issues a PCMCIA address at time T3, following the time T2, and in response to the microprocessor strobe, to one of the peripherals 26, 27, 28. Thereupon, at a time T4, following the time T2 of microprocessor strobe, a read strobe is issued to the PCMCIA card peripheral. At a time T5, the PCMCIA address will be valid to read data from the card. At a time T6, data will be valid on the ISA bus. Not shown in FIG. 3 is the optional negation and assertion of IOCHRDY or other microprocessor bus timing signals, in order to match the card's actual data access time to the possibly faster requirements of the default bus cycle of the microprocessor.

Figure 4:
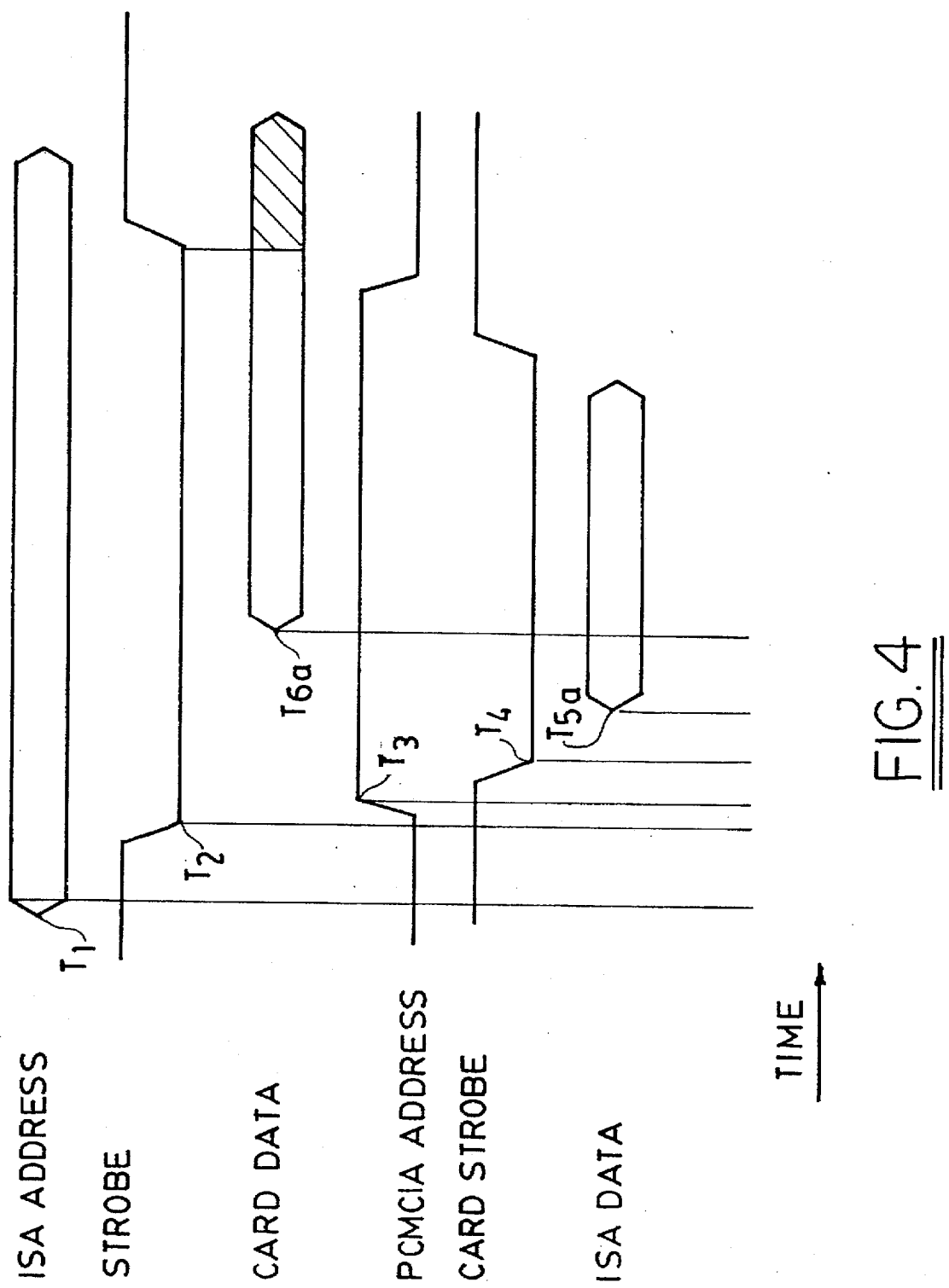
FIG. 4 is a timing diagram showing a write operation.

Turning to FIG. 4, a similar timing diagram is shown for writes from the microprocessor to the PCMCIA peripheral device. The only difference is that in FIG. 4, ISA bus data is valid at T5a; card data is then valid at T6a, which is after both T2 and T5a.

Figure 5:
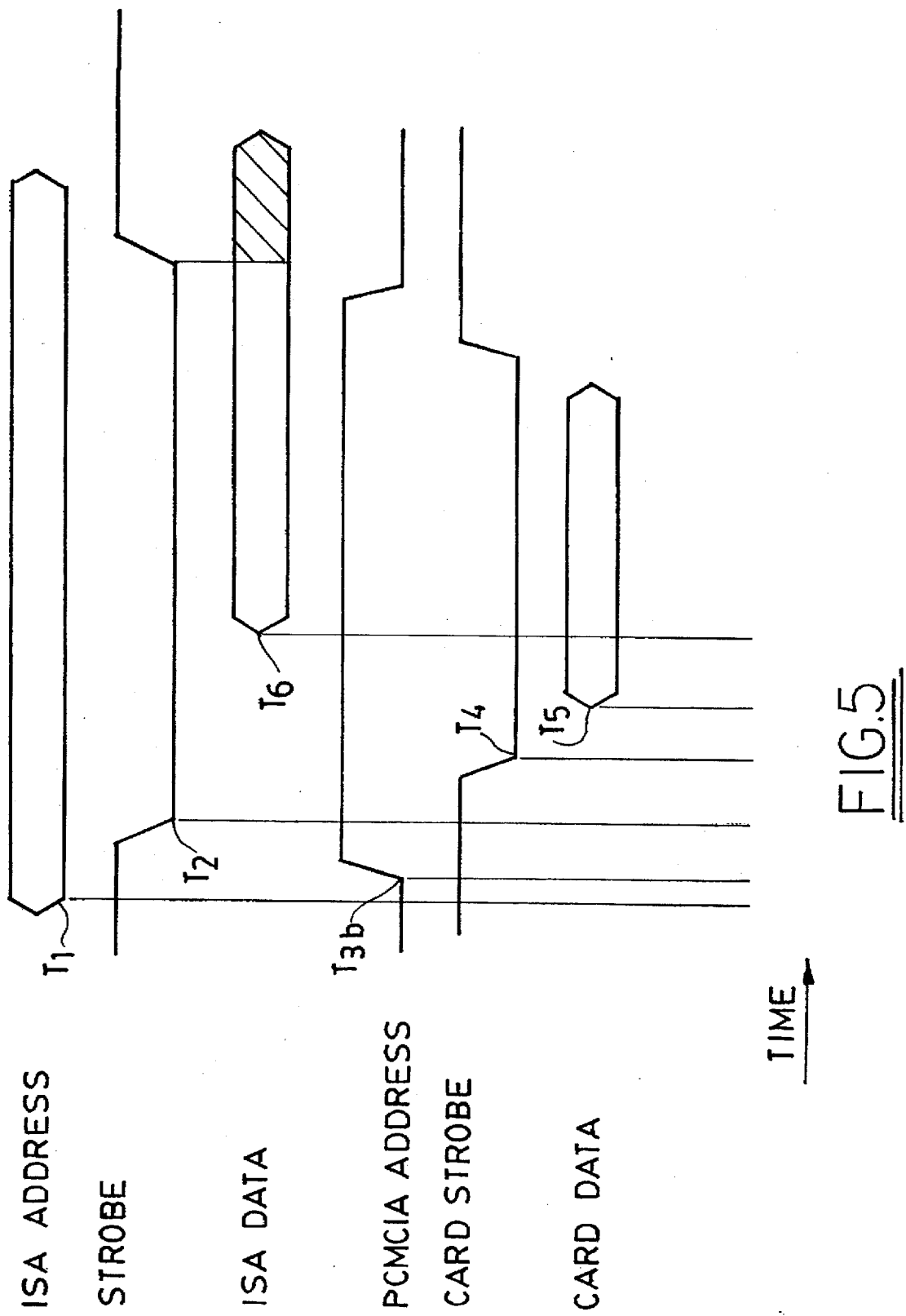
FIG. 5 is a timing diagram showing a read operation in non-quiet mode.

Turning to FIG. 5, a timing diagram is shown for the operation of the interface in non-quiet mode. The interface issues the PCMCIA address at time T3b; now, time T3b is prior to T2. Even if the T2 never occurs, or if the command detected at T2 is not in fact a command for the PCMCIA card, the address bus to the card has been changed, which causes power to be consumed for no benefit.

Certain complications may arise when operating such an interface component on a bus such as the ISA bus in which I/O addresses cannot be distinguished from memory addresses until a command is received. Referring to FIG. 2, components 532, 534 and 530 comprise the preferred means of correctly handling such situations. Both the memory comparator 504 and the I/O comparator 503 may match the same address.

Having thus described the preferred embodiment of the invention, those skilled in the art will appreciate that further additions, modifications, changes and deletions may be made thereto without departing from the spirit of the scope of the invention as set forth in the appended claims.

What I claim is:

1. A computer system having a microprocessor, a main bus having a plurality of lines carrying address, data and control signals and a read/write signal indicative of a command by the microprocessor to read information at an address or to write information to an address, said main bus for carrying said signals between the microprocessor and one or more peripherals, one or more peripheral ports for receiving a peripheral, and an interface component for coupling the main bus to one or more peripheral ports, said interface component having an interface bus that is selectively operable to connect peripheral ports to the main bus, said interface bus having a plurality of lines for carrying address, data and control signals, said interface component further comprising:

means for receiving said read/write signals and other signals indicative of the type of bus cycle in progress;

means for comparing an address on the main bus with the addresses of the peripheral ports and generating a match signal indicative of a match between an address on the main bus and an address of a peripheral port;

means responsive to said match signal and said read/write and other cycle indicative signals to selectively couple the address lines of the main bus to the address lines of a peripheral port;

at least one programmable I/O window for selectively associating I/O address regions on the main bus with peripherals attached to the peripheral ports, each I/O window having in addition at least one bit, either explicitly programmable or implicitly derived by a controller from other information specified in the I/O window; such bit specifying whether operations in the associated address region are to be quiet or not quiet;

at least one programmable memory window for selectively associating memory address regions on the main bus with peripherals attached to the peripheral ports, each memory window having in addition at least one bit, either explicitly programmable or implicitly derived by the controller from other information specified in the memory window; such bit specifying whether operations in the associated address region are to be quiet or not quiet; and logic means for deciding whether a cycle is to be quiet or non-quiet, based on the particular I/O windows or memory windows which are associated with the address present on the main bus.

2. The computer system of claim 1, wherein the interface component further contains means for generating a strobe signal accessible at an external pin on the interface component to selectively couple the peripheral ports to the main bus in accordance with the match and read/write signals.

3. The computer system of claim 1, wherein the interface component further comprises programmable means for normally uncoupling the peripheral port from the interface bus when the peripheral port is not addressed by the microprocessor.

4. The computer system of claim 1, wherein the interface component has a plurality of registers for holding at least one bit of data indicating whether a peripheral coupled to the interface component is to be operated in a quiet mode.

5. The computer system of claim 1, the interface component further comprising:

an interface to a bus in which I/O addresses cannot be distinguished from memory addresses until a command is received;

a means of deciding in logic conflicts which arise when a quiet memory window matches simultaneously with a non-quiet I/O window; and a means of deciding in logic conflicts which arise when a quiet I/O window matches simultaneously with a non-quiet memory window.

6. The computer system of claim 5, where each said peripheral port is a port in compliance with PCMCIA standards.

7. The computer system of claim 1, where each said peripheral port is a port in compliance with PCMCIA standards.

8. An interface component for coupling the main bus of a computer system to one or more peripheral ports, said interface component having an interface bus that is selectively operable to connect peripheral ports to the main bus, said interface bus having a plurality of lines for carrying address, data and control signals, said interface component further comprising:

means for receiving read/write signals and other signals indicative of the type of bus cycle in progress;

means for comparing an address on the main bus with the addresses of the peripheral ports and generating a match signal indicative of a match between an address on the main bus and an address of a peripheral port;

means responsive to said match signal and said read/write and other cycle indicative signals to selectively couple the address lines of the main bus to the address lines of a peripheral port;

at least one programmable I/O window for selectively associating I/O address regions on the main bus with peripherals attached to the peripheral ports, each I/O window having in addition at least one bit, either explicitly programmable or implicitly derived by a controller from other information specified in the I/O window; such bit specifying whether operations in the associated address region are to be quiet or not quiet;

at least one programmable memory window for selectively associating memory address regions on the main bus with peripherals attached to the peripheral ports, each memory window having in addition at least one bit, either explicitly programmable or implicitly derived by the controller from other information specified in the memory window; such bit specifying whether operations in the associated address region are to be quiet or not quiet; and logic means for deciding whether a cycle is to be quiet or non-quiet, based on the particular I/O windows or memory windows which are associated with the address present on the main bus.

9. The interface component of claim 8, the interface component further comprising:

a interface to a bus, in which I/O addresses cannot be distinguished from memory addresses until a command is received;

a means of deciding in logic conflicts which arise when a quiet memory window matches simultaneously with a non-quiet I/O window; and a means of deciding in logic conflicts which arise when a quiet I/O window matches simultaneously with a non-quiet memory window.

10. The interface component of claim 9, where each said peripheral port is a port in compliance with PCMCIA standards.

11. The interface component of claim 8, where each said peripheral port is a port in compliance with PCMCIA standards.

* * * * *